United States Patent
Zhao

(10) Patent No.: US 7,983,224 B2
(45) Date of Patent: Jul. 19, 2011

(54) METHOD FOR DELIVERING 1X NETWORK PAGING IN HIGH RATE PACKET DATA NETWORK

(75) Inventor: Xiaowu Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 229 days.

(21) Appl. No.: 12/497,582

(22) Filed: Jul. 3, 2009

(65) Prior Publication Data

US 2009/0316696 A1 Dec. 24, 2009

Related U.S. Application Data

(63) Continuation of application No. PCT/CN2007/003535, filed on Dec. 11, 2007.

(30) Foreign Application Priority Data

Jan. 4, 2007 (CN) .......................... 2007 1 0072907

(51) Int. Cl.
*H04B 7/216* (2006.01)
*H04W 4/00* (2009.01)

(52) U.S. Cl. ........ 370/335; 370/328; 370/342; 370/411; 370/479

(58) Field of Classification Search .................. 370/328, 370/335, 342, 441, 479
See application file for complete search history.

(56) References Cited

U.S. PATENT DOCUMENTS 7,912,009 B2 * 3/2011 Sayeedi et al. ................ 370/331
* cited by examiner

*Primary Examiner* — Ronald Abelson
(74) *Attorney, Agent, or Firm* — Christopher P. Maiorana, PC

(57) ABSTRACT

The present invention discloses a method for delivering paging from 1X network in HRPD (High Rate Packet Data) network, and the Secondary Color Code scheme is applied in the present invention, which enables the AN in which a MS/AT is registered to send an A13-paging request message to other adjacent ANs which are together therewith used for paging a mobile phone. For a MS/AT at multiple AN boundary, with the present invention, it enhances the possibility of receiving the paging through HRPD air interface control channel due to the service originated from 1X network, and can ensure the double network operation ability.

14 Claims, 2 Drawing Sheets

METHOD FOR DELIVERING 1X NETWORK PAGING IN HIGH RATE PACKET DATA NETWORK

This is a continuation of International Application PCT/CN2007/003535, with an International Filing date of Dec. 11, 2007, which claims priority to Chinese application No. 200710072907.9, filed Jan. 4, 2007, each of which is incorporated by reference.

FIELD OF THE INVENTION

The present invention relates to the interoperability between HRPD network (High Rate Packet Data network) and cdma2000 1x (Single carrier) in the wireless communication field, particularly to a method for the effective delivery of a mobile phone paging from 1x network in HRPD system within overlapped coverage of both HRPD and cdma2000 1x networks.

BACKGROUND OF THE INVENTION

Currently, as for the interoperability between the HRPD network and the 1x network, especially relating to the delivery of the mobile terminated paging from the 1x network in the HRPD system, the following methods are adopted in the prior art:

When IWS (Interworking Solution) is during the AN (Access Network), as shown in FIG. 1, this call flow is described as follows:

101: MSC (Mobile Switching Center) determines that an incoming call terminates to an MS/AT within its serving region. The MSC sends a Paging Request message to the HRPD AN (HRPD system access network) and one or more 1x BSs reachable by an MS/AT within the AN's paging area. The MSC starts an instance of timer T3113 for each Paging Request message sent.

MSC can include calling party information. Meanwhile, the paging request message can contains a "VPI (Visual Paging Indicator)" identifying that the 1x BS shall prepare to accept the paging response message from the MS/AT.

102: HRPD AN sends a "GPM (General Paging Message)" to the MS/AT. If the MSC includes calling party information, the IWS-1xBS includes a Feature Notification Message containing the calling party information in the same message.

103: The MS/AT is tuned to the 1x system and sends a paging response message via 1x access channel.

104: The 1x BS puts the paging response message in the Complete L3 Info message and sends the same to MSC. If the paging request message contains a Tag information unit, the 1x BS shall put this information unit in the paging response message. MS/AT default is that it is registered in the 1x system. MSC stops all the instances of timers T3113 for this MS/AT.

105: 1x BS/MSC continues the establishment process for calling the mobile station.

106: MSC can determine that the MS/AT subscribing for a "Cross Notification" service function has been registered in the 1x system, send an "Event Notification" message including the registration event to the HRPD AN, and start the timer Tevent. This step may occur at any time after the step "104".

107: After receiving the Event Notification message, the HRPD AN sends an event notification acknowledgement (Ack) message to MSC. Upon receiving this message, MSC stops the timer Tevent.

When IWS is located in 1x BS, as shown in FIG. 2, this flow is detailed as follows:

201: MSC finds a call terminated by the AT/MS in its service area, and then sends a paging request message to 1x IWS-BS, and starts an instance of timer T3113.

202: IWS-1xBS sends an A21-1x Air Interface Signaling message to the AN of HRPD, starts the timer Tack-21, and this message includes 1x paging message. Before requiring the HRPD to page the MS/AT, IWS-1xBS ensures that the resource supporting 1x service is available.

203: HRPD AN sends 1x paging message to the MS/AT.

204: The MS/AT acknowledges the receipt of the 1x paging message.

205: HRPD AN sends an A21 interface Ack (A21-Ack) message to IWS-1xBS, to acknowledge the receipt of the A21 message. IWS-1x BS stops the timer Tack-21. If HRPD AN does not find the AT/MS, the A21-Ack message includes a reason value being "Unknown MS/AT", and the call flow ends.

206: The MS/AT is tuned to 1x system and sends a paging response message at the 1x access channel to acknowledge the paging.

207: 1x BS constructs a paging response message which is put in the Complete 3L Info message and sends the same to MSC. If the paging response message includes a Tag information unit, 1x BS includes the same Tag information unit in the paging response message. MSC stops all the instance of timers T3113 related to this AT/MS.

208: 1x BS/MSC continues the call flow establishment which is terminated by the mobile phone.

209: IWS-1xBS sends an A21 interface event notification message to HRPD AN, to remind that its MS/AT is currently receiving the service from the 1x network. IWS-1xBS starts the timer Tack-21.

210: HRPD AN sends an A21 interface Ack (A21-Ack) message to IWS-1xBS, and IWS-1xBS stops the timer Tack-21.

From the above call flow, it is described that, when MS/AT is in HRPD system, how to send the voice paging from the 1x system to the mobile phone via the air interface of the HRPD system, so that it can turn to the 1x system and establish corresponding services.

However, there may be other HRPD ANs at the AN boundary where the MS/AT in idle state is located. With the movement of the MS/AT at the boundary, a back and forth registration, or so-called ping-pong effect, will occur between different ANs. In order to effectively curb and reduce such ping-pong effect and promote the paging mechanism between many different AN boundary areas as well as improve the success ratio of paging the MS/AT, the air interface of the prior art HRPD defines a Secondary Color Code scheme, which can ensure that one AN is able to page a MS/AT which is in the service area of other ANs. This technology has been applied to the packet data service originated by the HRPD network but has not been applied to delivery of the voice service paging from the 1x by the HRPD network, especially the delivery of the voice service paging from the 1x in the HRPD network when the MS/AT is at many AN boundaries of HRPD, and the current access network technologies have not solved this problem.

SUMMARY OF THE INVENTION

The technical problem to be solved by the present invention is to ensure that during HRPD system delivering the voice service paging service originated from 1x, a MS/AT in Idle state at multiple AN boundary areas of HRPD can effectively accept the service paging originated from 1x network, and to promote the interoperability between HRPD network and 1x network.

The present invention adopts the following technical solution:

A method for delivering a paging originated from 1x network in HRPD network includes the following steps when IWS is located in the AN:

a: MSC sends a paging request message to the HRPD AN and one or more 1x BS which can be reached by a double-mode terminal MS/AT in the AN paging area;

b: a source AN sends an A13-paging request message to a target AN and accepts an A13-paging response message returned by the target AN;

c: the source AN and the target AN send to the MS/AT a general paging message, respectively;

d: the MS/AT sends to the 1x BS the paging response message of air interface, and the 1x BS constructs a paging response message according to this message, puts the paging response message in Complete L3 message and then sends it to the MSC, and starts an establishment process for calling a mobile station; and e: the MSC can send to the source AN a event notification message including the registration event, and accept an event notification Ack message returned by the source AN.

Meanwhile, the source AN is the one that is registered by the AT/MS in the HRPD system with the registration updated at the MSC which is connected with the source AN; and the target AN is other ANs at the boundary of the source AN.

Meanwhile, in step b, the A13-paging request message may also be other newly defined message which meets the function that the source AN requests the target AN to help complete paging the MS/AT, and the A13-paging response message may also be a corresponding newly defined message.

Meanwhile, in step b, the A13-paging request message includes relevant session information of the AT, which is necessary for the target AN, and can further include time information about the source AN sending the paging.

Meanwhile, the target AN is one or more AN of the HRPD.

A method for delivering a paging originated from 1x network in HRPD network includes the following steps when IWS is located in the 1x BS:

A: MSC sends a paging request message to IWS-1x BS;

B: IWS-1x BS sends to a source AN of HRPD an A21 interface air interface signaling message;

C: the source AN sends an A13-paging request message to a target AN, and accepts an A13-paging response request message returned by the target AN;

D: the source AN and the target AN send a 1x paging message to the MS/AT, respectively;

E: the MS/AT sends a 1x paging response message to the source AN or the target AN; if the target AN accepts the paging response message, it sends an A13-paging delivered message to the source AN, and the source AN returns an A13-paging delivered Ack message to the target AN;

F: the source AN sends an A21-interface Ack message to the IWS-1x BS;

G: the MS/AT sends the paging response message of air interface to the 1x BS, and the 1x BS constructs a paging response message according to this message, puts the paging response message in Complete L3 message and sends the same to the switch, and starts an establishment process for calling a mobile station; and H: the IWS-1x BS sends an A21 interface event notification message to the source AN of the HRPD; and the source AN of the HRPD sends an A21 interface event Ack notification message to the IWS-1x BS.

Meanwhile, the step F further includes that: if the source AN does not find the MS/AT, or does not accept any A13-paging delivered message from the target AN, the A21-interface Ack message includes a reason value being "Unknown MS/AT", and the call flow ends.

Meanwhile, in the step C, the A13-paging request message includes relevant session information of the AT which is necessary for the target AN, and can further include time information about the AN sending the paging.

Meanwhile, the A13-paging request message in the step C may also be other newly defined message which meets the function that the source AN requests the target AN to help complete paging the MS/AT, and the A13-paging response message may also be a corresponding newly defined message.

Meanwhile, the target AN is one or more AN of the HRPD.

The present invention achieves the following advantageous effects:

For a MS/AT at the boundary of multiple ANs, with the present invention, it can enhance the chance of receiving paging through HRPD air interface control channel due to the service originated from the 1x network, ensure that the service originated from the 1x network can be correctly and timely delivered to the MS/AT of the HRPD system, and can ensure the double network operation ability.

Figure 1:
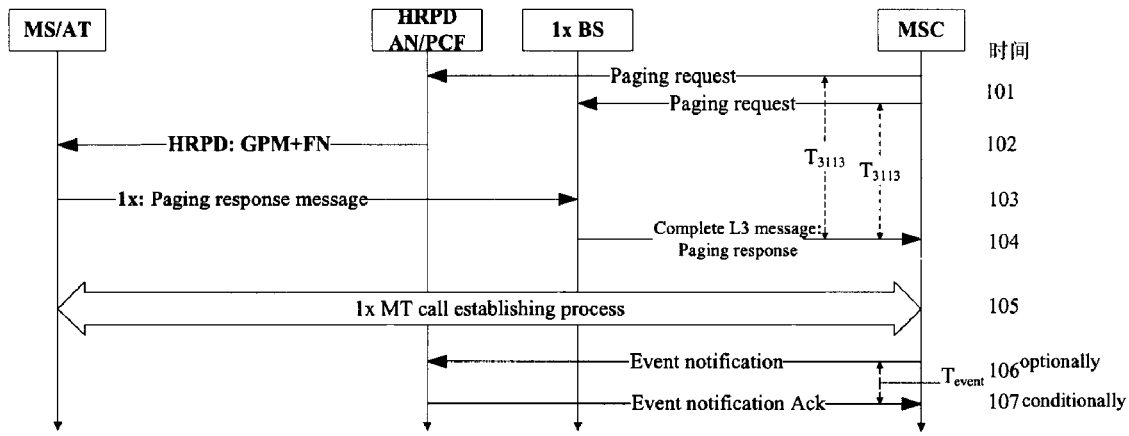
FIG. 1 is a flowchart of the existing method for the delivery of 1x paging in the HRPD network when the IWS is located in AN.

(1) HRPD: High Rate Packet Data network;

(2) 1x: also referred to as 3G 1x, or cdma2000 1x, represents a cdma2000 single carrier-network;

(3) MS/AT: referring to a double-mode terminal, which can operate in both the HRPD network and the 3G 1x network, and generally, the terminal of the 3G 1x network refers to MS (Mobile Station), and the terminal of the HRPD network refers to AT (Access Terminal);

(4) HRPD AN: referring to the AN (Access Network) of the HRPD network, and it is a logic entity integrated into the wireless AN for communicating with the access terminal;

(5) PCF: Packet Cantonal Function;

(6) 1x BS: referring to the base station in the 3G 1x network;

(7) MSC: referring to the switch in the 3G 1x network;

(8) IWS: Interworking Solution;

(9) IWS-BS: the IWS is located in the BS;

(10) Secondary Color Code

(11) A21: A21 interface, referring to the interface between the AN of the HRPD and the 1x BS;

(12) A13: A13 interface, referring to the interface between the ANs of the HRPD;

(13) Paging request: Paging request message;

(14) GPM: General Paging Message;

(15) FN: Feature Notification message;

(16) Page Response Message;

(17) Complete 3L Info: Complete layer 3 information message;

(18) Event Notification: Event Notification Message;

(19) Event Notification Ack: Event Notification Ack Message;

(20) 1x MT Call Proceeds: establishment process for calling the mobile phone in 1x network;

(21) A21-1x Air Interface Signaling: A21 Interface Air Interface Signaling Message;

(22) A21-Ack: A21 Interface Ack Message;

(23) 3G1x Service Packet;

(24) 3G1x Service Ack: 3G 1x service packet Ack;

(25) A13-Paging Request: A13-paging request message;

(26) A13-Paging Response: A13-paging response message;

(27) A13 Paging Delivered: A13-paging delivered message;

(28) A13 Paging Delivered Ack: A13-paging delivered Ack message;

(29) A21-Event Notification: A21 interface event notification message;

(30) A21-Event Notification Ack: A21 interface event notification Ack message; and

(31) T3113, Tevent, Tack-21, Tpreq-13: corresponding timers.

DETAILED DESCRIPTION

The present invention will be further detailed hereinafter in conjunction with the figures and the embodiment thereof.

In the present invention, the Secondary Color Code scheme is applied for delivering in the HRPD network the voice service paging service originated from the 1x, which enables the AN which a MS/AT is registered in to send an A13-paing request message to other adjacent ANs, which are used along together for paging the mobile phone.

The AN, which the MS/AT in the HRPD system is registered in, is set as a source AN with the registration updated at the MSC which is connected with the AN. Other ANs at the boundary of the source AN are the target AN.

When the IWS is located in the AN, the present invention includes the following steps:

a: MSC sends a paging request message to the HRPD AN and one or more 1x BS which can be reached to by a double-mode terminal MS/AT in the paging area of the AN;

b: the source AN sends an A13-paging request message to the target AN and accepts an A13-paging response message returned by the target AN;

c: the source AN and the target AN send to the MS/AT a general paging message, respectively;

d: the MS/AT sends to the 1x BS the paging response message of air interface, and the 1x BS constructs a paging response message according to this message, puts the paging response message in Complete L3 message and then sends it to the MSC, and starts an establishment process for calling a mobile station; and e: the MSC sends to the source AN a event notification message including a registration event, and accepts an event notification Ack message returned by the source AN.

Figure 3:
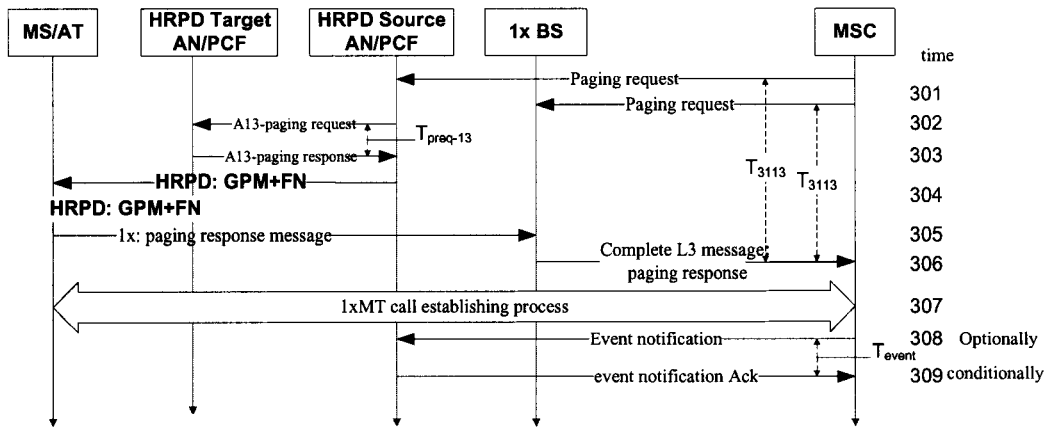
FIG. 3 is a flowchart of the method for the delivery of 1x paging in the HRPD network when the IWS is located in AN, wherein the method is based on the support of Secondary Color Code.

FIG. 3 describes the detailed signaling flow of this method when the IWS is located in the AN, including the following steps:

301: MSC finds a voice call of the MS/AT within its service area. MSC sends a paging request message to the HRPD AN and one or more 1x BS which can be reached by the MS/AT within the paging area of the AN. MSC starts an instance of timer T3113 for each paging request message. The MSC can include calling party information. Note: the paging request message can include a "VPI (Visual Paging Indicator)", which represents that the 1x BS shall prepare to accept the paging response message from the MS/AT.

302: The source AN decides to page the MS/AT via its own RT (Radio Transceiver) or together with some RTs of the target AN, the source AN sends an A13-paging request message to the target AN, and starts timer TPreq-13. This message includes the relevant session information of the AT which is necessary for the AN determining the paging area and etc. This message can further include time information about the source AN sending the paging. If the target AN can send paging within the same timeslot, the possibility that the AT misses the paging will become reduced, wherein there can be multiple target ANs, while only one is shown in this embodiment.

303: The target AN sends an A13-paging response message to the source AN. After receiving this message, the source AN stops corresponding timer Tpreq-13.

304: The source AN and the target AN send a "General Paging Message" at the air interface control channel thereof. If the MSC includes the calling party information in step 301, such information is included in a FN message and is together with the FN message sent to the MS/AT.

305: The MS/AT is tuned to the 1x system and sends a paging response message via 1x access channel.

306: The 1x BS puts the paging response message in the Complete L3 Info message and sends the same to the MSC. If the paging request message includes a Tag information unit, the 1x BS shall puts this information unit into the paging response message. MS/AT default is that it is registered in the 1x system. The MSC stops all the instances of timers T3113 for this MS/AT.

307: 1x BS/MSC continues the establishment process for calling the mobile station.

308: MSC can determine that the MS/AT subscribing for a "Cross Notification" service function has been registered in the 1x system, sends an "Event Notification" message including the registration event to the source AN of the HRPD, starts timer Tevent. This step may occur at any time after the step "306".

309: The source AN of the HRPD sends an event notification Ack message to the MSC and stops the timer Tevent.

When the IWS is located in the 1x BS, the present invention includes the following steps:

A: MSC sends a paging request message to IWS-1x BS;

B: IWS-1x BS sends to the source AN of the HRPD an A21 interface air interface signaling message;

C: the source AN sends an A13-paging request message to the target AN, and accepts an A13-paging response request message returned by the target AN;

D: the source AN and the target AN send a 1x paging message to the MS/AT, respectively;

E: the MS/AT sends a 1x paging response message to the source AN or the target AN; if the target AN accepts the paging response message, it sends an A13-paging delivered message to the source AN, and the source AN then returns an A13-paging delivered Ack message to the target AN;

F: the source AN sends an A21-interface Ack message to the IWS-1x BS;

G: the MS/AT sends the paging response message of air interface to the 1x BS, and the 1x BS constructs a paging response message according to this message, puts the paging response message in Complete L3 message and sends the same to the switch, and starts an establishment process for calling a mobile station; and H: the IWS-1x BS sends an A21 interface event notification message to the source AN of the HRPD; and the source AN of the HRPD sends an A21 interface event Ack notification message to the IWS-1x BS.

Figure 4:
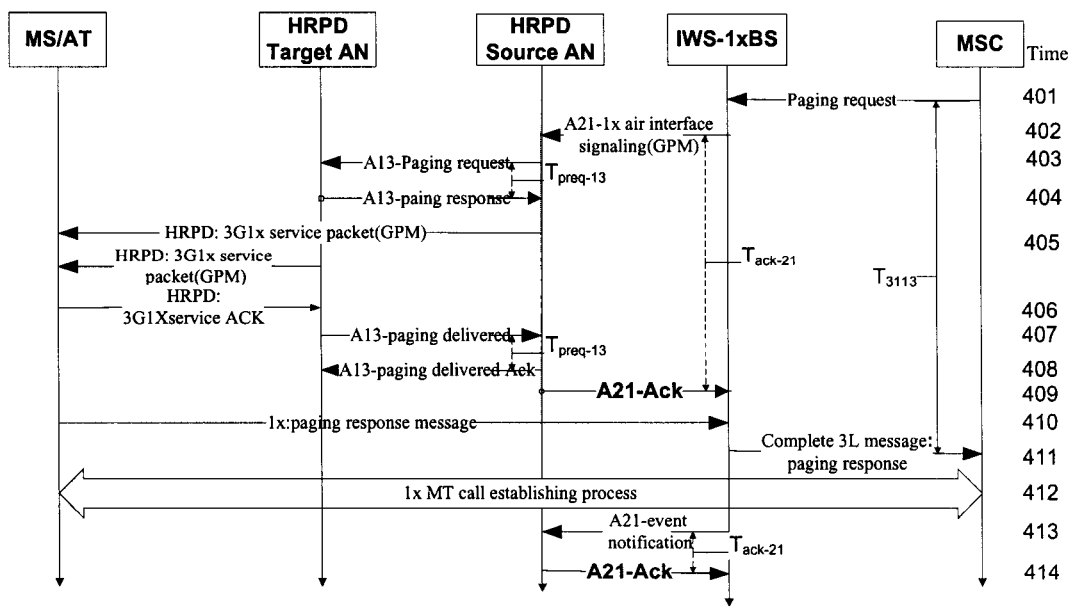
FIG. 4 is a flowchart of the method for the delivery of 1x paging in the HRPD network when the IWS is located in 1xBS, wherein the method is based on the support of Secondary Color Code; and The abbreviations and terms in the figures are explained as follows.

FIG. 4 describes the flow of the method for delivering 1x paging in the HRPD network when the IWS is located in the 1x BS, including the following steps:

401: MSC determines one call terminated by the AT/MS in its service area, and then sends a paging request message to 1x IWS-BS, and starts an instance of timer T3113.

402: IWS-1xBS sends an A21 interface air interface signaling message to the source AN of the HRPD and starts the timer Tack-21, and this message includes 1x paging message. Before requiring the HRPD to page the MS/AT, IWS-1xBS ensures that the resource supporting 1x service is available.

403: The source AN decides that it is necessary to page the MS/AT via its own RT or together with some RTs of the target AN, and the source AN sends an A13-paging request message to the target AN and starts timer TPreq-13. This message includes the relevant session information of the AT which is necessary for the AN to determine the paging area and etc. This message can further include time information about the source AN sending the paging and so on. If the target AN can send the paging within the same timeslot, the possibility that the AT misses the paging will become reduced, wherein there can be multiple target ANs, while only one is shown in this embodiment.

404: The target AN sends an A13-paging response message to the source AN. After receiving this message, the source AN stops corresponding timer Tpreq-13.

Figure 2:
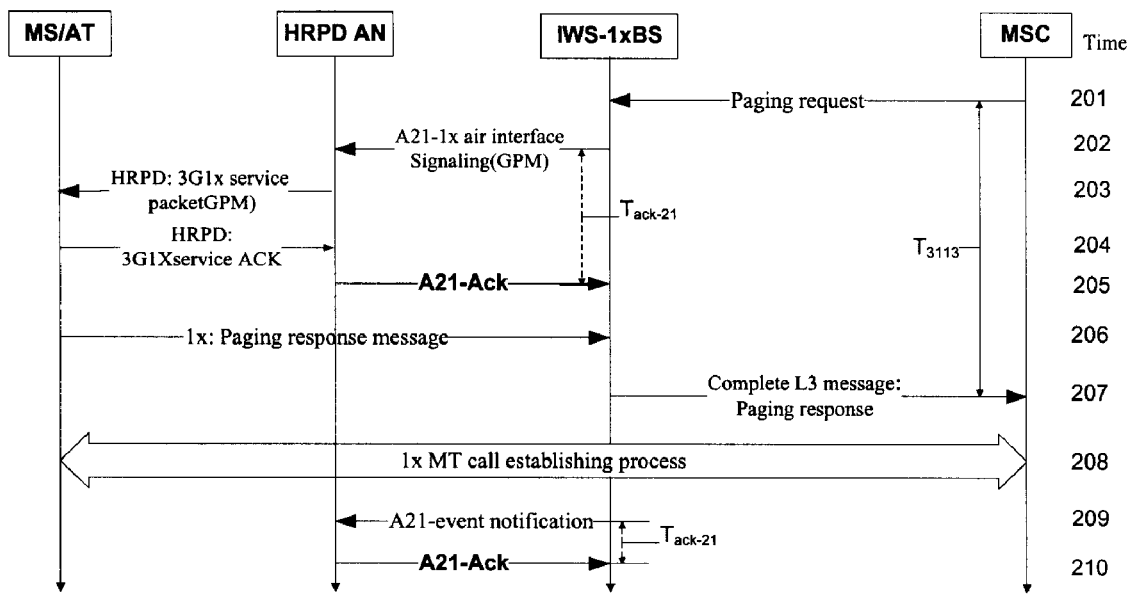
FIG. 2 is a flowchart of the existing method for the delivery of 1x paging in the HRPD network when the IWS is located in 1xBS.

405: The source AN and the target AN of the HRPD send a 1x paging message to the MS/AT, respectively. In this call flow, it is supposed that the target AN accepts the confirmation from the MS/AT. If the source AN has accepted the Ack message from the MS/AT, the subsequent call flow is consistent with that of the prior art, and please refer to the call flow in FIG. 2.

406: The MS/AT acknowledges with the target AN the receipt of the 1x paging message;

407: The target AT sends an A13 paging delivered message to the source AN, showing that the MS/AT has accepted the paging message. The target AN starts the timer Tpreq-13.

408: The source AN sends an A13-paging delivered Ack message to the source AN to respond to the A13 paging delivered message, and the source AN stops the timer Tpreq-13.

409: The source AN of the HRPD sends an A21-Ack message to the IWS-1x BS to acknowledge the receipt of the A21 message. The IWS-1xBS stops timer Tack-21. If the HRPD AN does not find the AT/MS, or does not accept any A13 paging delivered Ack message from the target AN, the A21-Ack message includes a reason value being "Unknown MS/AT", and the flow ends.

410: The MS/AT is tuned to 1x system, and sends at the access channel of the 1x a paging response message to the 1x BS for acknowledging the paging.

411: The 1x BS constructs a paging response message, puts the same in the Complete L3 Info message and sends the same to MSC. If the paging request message includes one Tag information unit, the 1x BS includes the same Tag information unit in the paging response message. MSC stops all the instances of timers T3113 related to this MS/AT.

412: 1x BS/MSC continues the establishment of the call flow terminated by the mobile phone.

413: IWS-1xBS sends an A21 interface event notification message to HRPD AN to remind that its MS/AT is currently receiving the service from the 1x network. IWS-1xBS starts the timer Tack-21.

414: The HRPD AN sends an A21 interface Ack message to the IWS-1xBS which then stops the timer Tack-21.

The above description is only preferable embodiments of the present invention, which is not used for restricting the present invention. For those skilled in the art, the present invention may have various changes and variations. Any amendments, equivalent substitutions, improvements etc. within the spirit and principle of the present invention are all covered by the scope of protection of the present invention.

What is claimed is:

1. A method for delivering a paging originated from 1x network in High Rate Packet Data network (HRPD) characterized in that when Interworking Solution is applied in the Access Network (AN) of the HRPD network, the method includes the following steps:
    a. the switch of the 1x network sends a paging request message to the source access network of the HRPD network system and one or more base stations of 1x network which can be reached by a double-mode terminal in the paging area thereof;
    b. the source access network sends an A13-paging request message to a target access network and accepts a A13-paging response message returned by the target access network;
    c. the source access network and the target access network send to the double-mode terminal a general paging message, respectively; and
    d. the double-mode terminal sends to the base station of the 1x the paging response message of air interface, and the base station of the 1x constructs a paging response message according to this message, puts the paging response message in Complete L3 message and then sends it to the switch, and starts an establishment process for calling a mobile station.

2. The method for delivering a paging originated from 1x network in HRPD network according to claim 1 further including step e: the switch of the 1x network sends to the source access network an event notification message including the registration event, and accepts an event notification Ack message returned by the source access network.

3. The method for delivering a paging originated from 1x network in HRPD network according to claim 1 characterized in that the source access network is an access network which is registered by the double-mode terminal in the HRPD network system with the registration updated at the switch which is connected with the access network; and the target access network is other access networks at the boundary of the source access network.

4. The method for delivering a paging originated from 1x network in HRPD network according to claim 1 characterized in that, in the step b, the A13-paging request message is other newly defined message which meets the function that the source access network requests the target access network to help complete paging the double-mode terminal, or the A13-paging response message is a corresponding newly defined message.

5. The method for delivering a paging originated from 1x network in HRPD network according to claim 1 characterized in that, in the step b, the A13-paging request message includes the relevant session information of the terminal of the HRPD network, which is necessary for the target access network.

6. The method for delivering a paging originated from 1x network in HRPD network according to claim 5 characterized in that, in the step b, the A13-paging request message further includes time information about the source access network sending the paging.

7. The method for delivering a paging originated from 1x network in HRPD network according to any of claim 1 characterized in that the target access network is one or more access network of the HRPD system.

8. A method for delivering a paging originated from 1x network in HRPD network characterized in that when Interworking Solution is applied to 1x base station, the method includes the following steps:
  A. a switch sends a paging request message to the 1x base station where the Interworking Solution is;
  B. the 1x base station sends to a source access network an A21 interface air interface signaling message;
  C. the source access network sends an A13-paging request message to a target access network, and accepts an A13-paging response request message returned by the target access network;
  D. the source access network and the target access network send a 1x paging message to a double-mode terminal, respectively;
  E. the double-mode terminal sends a 1x paging response message to the source access network or the target access network; if the target access network accepts the paging response message, it sends an A13-paging delivered message to the source access network, and the source access network returns an A13-paging delivered Ack message to the target access network;
  F. the source access network sends an A21-interface Ack message to the 1x base station where the Interworking Solution is; and
  G the double-mode terminal sends the paging response message of air interface to the 1x base station, and the 1x base station constructs a paging response message according to this message, puts the paging response message in Complete L3 message and sends the same to the switch, and starts an establishment process for calling a mobile station.

9. The method for delivering a paging originated from 1x network in HRPD network according to claim 8 characterized in that the method further includes step H: the 1x base station, where the Interworking Solution is, sends an A21 interface event notification message to the source access network, and accepts an A21 interface event Ack notification message returned by the source access network.

10. The method for delivering a paging originated from 1x network in HRPD network according to claim 8 characterized in that the step F further includes that: if the source access network does not find any double-mode terminal, or does not accept any A13-paging delivered message from the target access network, the A21 interface Ack message includes a reason value being "Unknown MS/AT", and the flow ends.

11. The method for delivering a paging originated from 1x network in HRPD network according to claim 8 characterized in that the A13-paging request message in step C is other newly defined message which meets the function that the source access network requests the target access network to help complete paging the double-mode terminal, or the A13-paging response message is a corresponding newly defined message.

12. The method for delivering a paging originated from 1x network in HRPD network according to claim 8 characterized in that, in the step C, the A13-paging request message includes the relevant session information of the terminal of the HRPD network, which is necessary for the target access network.

13. The method for delivering a paging originated from 1x network in HRPD network according to claim 11 characterized in that, in the step C, the A13-paging request message further includes time information about the source access network sending the paging.

14. The method for delivering a paging originated from 1x network in HRPD network according to any of claim 8 characterized in that the target access network is one or more access network of the HRPD system.

* * * * *